(12) United States Patent
Tokita et al.

(10) Patent No.: US 8,231,466 B2
(45) Date of Patent: Jul. 31, 2012

(54) GAME APPARATUS, GAME PROGRAM AND INFORMATION RECORDING MEDIUM

(75) Inventors: Takashi Tokita, Tokyo (JP); Tomoya Asano, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 137 days.

(21) Appl. No.: 12/781,326

(22) Filed: May 17, 2010

(65) Prior Publication Data

US 2010/0292004 A1 Nov. 18, 2010

(30) Foreign Application Priority Data

May 18, 2009 (JP) .................................. 2009-119596

(51) Int. Cl.
*A63F 13/00* (2006.01)
*A63F 9/24* (2006.01)
(52) U.S. Cl. ........................................................ 463/32
(58) Field of Classification Search ...................... 463/32
See application file for complete search history.

(56) References Cited

U.S. PATENT DOCUMENTS

| | | | | |
|---|---|---|---|---|
| 7,625,287 | B2 * | 12/2009 | Champagne et al. | 463/38 |
| 8,033,914 | B2 * | 10/2011 | Yoshikawa et al. | 463/36 |
| 2002/0016194 | A1 * | 2/2002 | Namba et al. | 463/3 |
| 2003/0166413 | A1 * | 9/2003 | Hayashida et al. | 463/30 |
| 2003/0190950 | A1 * | 10/2003 | Matsumoto | 463/30 |
| 2005/0187015 | A1 * | 8/2005 | Suzuki et al. | 463/32 |
| 2008/0100531 | A1 | 5/2008 | Yoshinaga et al. | |
| 2008/0139308 | A1 | 6/2008 | Kamiyama et al. | |
| 2008/0293466 | A1 | 11/2008 | Arakawa et al. | |
| 2009/0061970 | A1 * | 3/2009 | Wylie et al. | 463/1 |
| 2010/0048271 | A1 * | 2/2010 | Champagne et al. | 463/6 |

FOREIGN PATENT DOCUMENTS

| | | |
|---|---|---|
| JP | 2002-306849 | 10/2002 |
| JP | 2005-204762 | 8/2005 |
| JP | 2005-278938 | 10/2005 |
| JP | 2009-70076 | 4/2009 |
| WO | 2006/106765 | 10/2006 |

OTHER PUBLICATIONS

Mario Kart 64 Manual.*
Nanashino Game (the Nameless Game), Weekly Famitsu, Enterbrain, Inc., vol. 23, ed. 20, pp. 224-225 (May 16, 2008), and English language translation.

* cited by examiner

*Primary Examiner* — Xuan Thai
*Assistant Examiner* — Michael Grant
(74) *Attorney, Agent, or Firm* — Greenblum & Bernstein, P.L.C.

(57) ABSTRACT

It is an object of the present invention to provide a game apparatus capable of image processing with effective use of having a plurality of screens. The game apparatus according to the present invention has a specific object display controller. The game apparatus according to the present invention executes the processing of displaying a specific object in a 3D game space on one display screen and hiding it on the other display screen. This enables effective use of having a plurality of screens and the image processing that attracts users.

20 Claims, 14 Drawing Sheets

GAME APPARATUS, GAME PROGRAM AND INFORMATION RECORDING MEDIUM

CROSS REFERENCE TO RELATED APPLICATIONS

This present application claims the benefit of Japan Patent Application No. 2009-119596, filed on May 18, 2009, which is incorporated herein by reference in its entirety.

TECHNICAL FIELD

The present invention generally relates to a game apparatus capable of displaying a 3D game space on the two display screens. More specifically, the present invention relates to a game apparatus capable of controlling to display a specific object on one display screen and not to display it on the other display screen. The present invention further relates to a game program and an information recording medium used in such a game apparatus.

BACKGROUND ART

A game machine that has two display screens is known. For example, Japanese Laid-Open Patent Application No. 2005-278938 (Patent Document 1) discloses a game machine that has two display screens (FIG. 1). The game machine utilizes two display screens as if it had one pseudo display screen (FIG. 4). Namely, the game machine can display one 3D game space on two tandem display screens. The other related prior art documents are the pamphlet of WO2006-106765 and Japanese Laid-Open Patent Application No. 2009-70076. These references are incorporated herein by reference in its entirety.

PRIOR ART DOCUMENT

Patent Document

Patent Document 1:
Japanese Laid-Open Patent Application No. 2005-278938 (FIG. 1 and 4)
Patent Document 2:
The pamphlet of WO2006-106765
Patent Document 3:
Japanese Laid-Open Patent Application No. 2009-70076

DISCLOSURE OF THE INVENTION

Problem to be Solved by the Invention

The game machine disclosed in the above Patent Document 1 can display images on the two adjacent display screens as if they were one display screen. However, the game machine does not obtain any meritorious effect even though it has two display screens.

Therefore, it is an object of the present invention to provide a game apparatus capable of executing image processing effectively making use of a plurality of screens.

It is another object of the present invention to provide a game apparatus capable of executing image processing that attracts users utilizing a plurality of screens.

Furthermore, it is still another object of the present invention to provide a game program used in the above game apparatus and an information recording medium stored with the game program.

Means for Solving Problem

The present invention is basically based on the following novel viewpoint. The game apparatus of the present invention has at least two display screens. The apparatus can control a specific object to be shown on the first display screen when the object exist on the region of the first display screen and not to be shown on the second display screen when the second screen when the object exists on the region of the second display screen. The apparatus makes the use of multi display screens and thus it can attract users.

The first aspect of the present invention relates to a game apparatus having a plurality of screens. The game apparatus comprises an inputter 21, a first display screen 23, a second display screen 25, a game space image data storage 31, a viewpoint mover 33, a game space image generator 35, a specific object storage 37, and a specific object position determiner 39. The game apparatus further comprises a specific object display controller 41.

The inputter 21 is a device that inputs operation information in respect of a game. Each of the first display screen 23 and the second display screen 25 is a screen that displays a game image (game space image). The game space image data storage 31 is a device that stores image data of a game space displayed on the first display screen 23 and the second display screen 25. The viewpoint mover 33 is a device that moves a viewpoint in a game space based on the operation information input from the inputter 21. The game space image generator 35 is a device that reads out image data of a game space from the game space image storage and generating an image of the game space displayed on the first display screen 23 and the second display screen 25 with the use of information on the movement of a viewpoint by the viewpoint mover 33. The specific object storage 37 is a device that stores information on a specific object existing in a game space. The specific object position determiner 39 is a device that determines whether the specific object stored in the specific object storage 37 exists in the display region of the first display screen or the display region of the second display screen 25.

The game apparatus according to the first aspect of the present invention further comprises a specific object display controller 41. In case the specific object position determiner 39 determines that the specific object exists in the display region of the first display screen 23, the specific object display controller 41 controls to display the specific object on the first display screen 23. On the other hand, in case the specific object position determiner 39 determines that the specific object exists in the display region of the second display screen 25, the specific object display controller 41 controls not to display the specific object. Such a control enables processing of displaying the specific object in a 3D game space on one display screen and hiding it on the other display screen. For example, the game apparatus enables such image processing where an enemy, which is invisible on the second display screen 25, can be displayed on the first display screen 23. This enables effective use of a plurality of screens and thus the system can provide an image processing that attracts users.

A preferred embodiment of the game apparatus according to the first aspect of the present invention relates to a game apparatus which comprises a specific object contact determiner 51. The specific object contact determiner 51 is a device that determines whether a player character, which is the subject of a viewpoint, has contacted with the specific object existing in the display region of the first display screen 23 or the second display screen 25.

The game apparatus of this embodiment, in case an invisible enemy exists in the display region of the second display screen 25, for example, can determine whether or not a player character has contacted with the enemy. In case a player character has contacted with an enemy, for example, the game apparatus can execute processing such as reducing life points of the player character or killing the player character. Thus, the presence of an invisible enemy increases users' feeling of tension, which attracts users.

Another preferred embodiment of the game apparatus according to the first aspect of the present invention relates to a game apparatus where the second display screen 25 comprises a touch panel. The game apparatus of this embodiment further comprises a specific object indication determiner 53. The specific object indication determiner 53 is a device that determines whether the indication information from the touch panel indicates a hidden specific object existing in the display region of the second display screen 25 and is controlled not to be displayed by the specific object display controller. The game apparatus of this embodiment can be used in conjunction with any configuration of the embodiments as described earlier.

The game apparatus of this embodiment can determine whether a user has indicated an invisible specific object in the second display screen 25. The game apparatus can execute processing, in case an invisible specific object is a door, such as opening the door. Thus, the game apparatus can let a user memorize the place of the door with the first display screen 23 and indicate the door on the second display screen 25 from the user's memory, which attracts users.

The second aspect of the present invention relates to a game program. The game program is basically a program that causes an apparatus for game to serve as the game apparatus as described earlier. Therefore, the game apparatus using the game program comprises an inputter 21 that inputs operation information on a game, a first display screen 23 and a second display screen 25 that displays a game image, and a computer. The game program causes the computer to move a viewpoint in a game space based on the operation information input from the inputter 21. The program also causes the computer to generate an image of the game space displayed on the first display screen 23 and the second display screen 25 with the use of information on the movement of a viewpoint. Furthermore, the program causes the computer to determine whether a specific object in a game space exists in the display region of the first display screen 23 or the display region of the second display screen 25. In case the computer determines that a specific object exists in the display region of the first display screen 23, the program causes the computer to control to display the specific object, whereas, in case the computer determines that a specific object exists in the display region of the second display screen 25, the program causes the computer to control not to display or hide the specific object.

In a preferred embodiment of the second aspect of the present invention, the program causes the computer to determine whether a player character which is a subject of the viewpoint has contacted with a specific object existing in the display region of the first display screen 23 or the specific object existing in the display region of the second display screen 25.

Another preferred embodiment of the second aspect of the present invention is such that the second display screen 25 comprises a touch panel. In case the computer has received indication information from the touch panel, the program further causes the computer to determine whether the indication information indicates the specific object that exists in the display region of the second display screen 25 and is controlled not to be displayed. The program of this embodiment can be used in conjunction with any configuration of the embodiments as described earlier.

The third aspect of the present invention relates to a computer-readable information recording medium stored with any of the above game programs.

Advantageous Effect of the Invention

The game apparatus of the present invention has at least two display screens. The apparatus can control a specific object in a 3D game space to be shown on the first display screen when the object exist on the region of the first display screen and not to be shown on the second display screen when the object exists on the region of the second display screen. The apparatus makes the use of multi display screens and thus it can attract users.

EMBODIMENTS FOR CARRYING OUT THE PRESENT INVENTION

Hereinafter, embodiments for carrying out the present invention will be described. It should be noted that the present invention is not limited to the embodiments as described hereinafter. The present invention includes the scope that can be modified appropriately within the scope apparent to those skilled in the art from the embodiments as described hereinafter.

Figure 1:
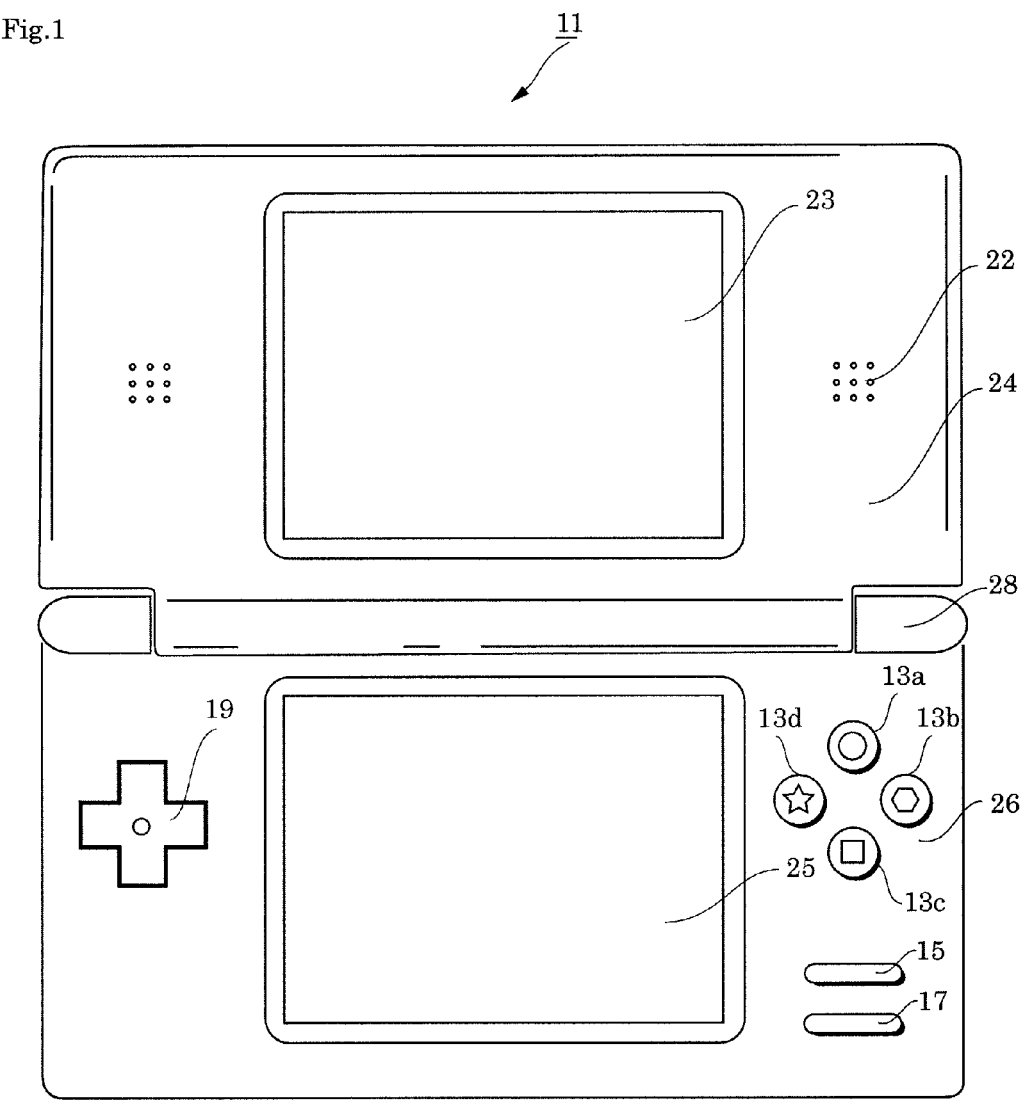
FIG. 1 shows an outline view of a game apparatus according to one embodiment of the present invention.
Figure 2:
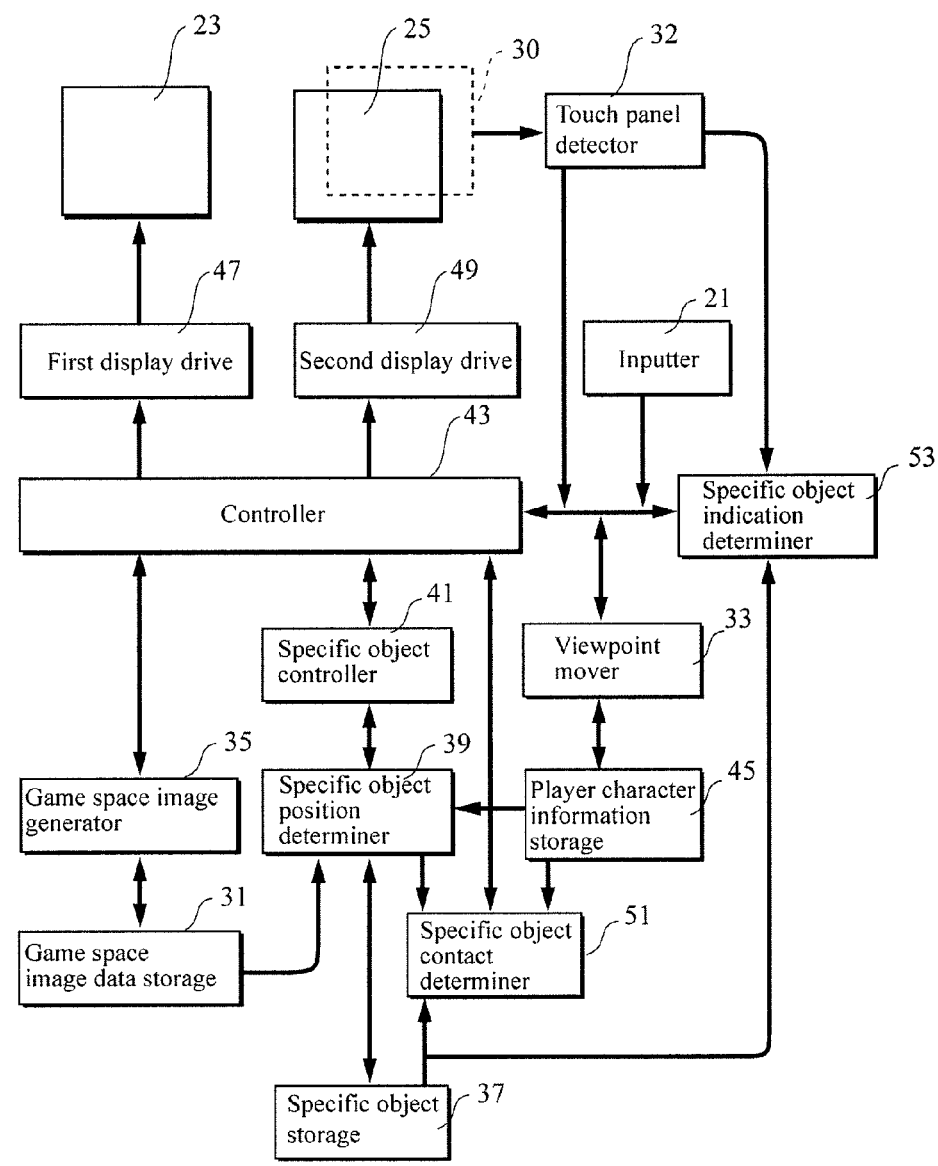
FIG. 2 shows an example of a block diagram of a game apparatus according to one embodiment of the present invention.

FIG. 1 shows an outline view of a game apparatus according to one embodiment of the present invention. FIG. 2 shows an example of a block diagram of a game apparatus according to one embodiment of the present invention. As shown in FIG. 1, the game apparatus 11 comprises operation buttons 13a-13d, a start switch 15, a selection switch 17, a direction indication switch 19, a first display screen 23, and a second display screen 25. The game apparatus as shown in FIG. 1 is a portable game apparatus. The game apparatus of the present invention may be any of a home game apparatus, a game apparatus with a housing, or a computerized game apparatus.

Each of the first display screen 23 and the second display screen 25 is screen that displays a game image. Examples of the first display screen 23 and the second display screen 25 are liquid crystal display screens, LCD monitors. The display screens may be organic EL display screens. As shown in FIG. 1, the game apparatus 11 comprises the first housing 24 that stores the first display screen 23. The game apparatus 11 also comprises the second housing 26 that stores the second display screen 25. In the example of FIG. 1, the first housing 24 and the second housing 26 are connected together via a connection part 28. Furthermore, in the example of FIG. 1, the first display screen 23 and the second display screen 25 are the same in size and are located on the same line across the space including the connection part 28. The first display screen 23 and the second display screen 25 may be different in size. Also, the first display screen 23 and the second display screen 25 may be mounted on separate devices.

The second display screen 25 preferably comprises a touch panel 30. The touch panel 30 may be mounted on the upper surface of the second display screen 25. An example of the touch panel 30 is such that information is input by touching the upper surface of the touch panel with a stick. The touch panel has a pressure sensing part that senses pressure over the entire surface. When pressure is applied to a certain position of the touch panel, the information that pressure is applied and the information on the position where pressure is applied are transmitted to a touch panel detector 32 within the game apparatus. The touch panel detector 32 analyzes the information detected by the touch panel 30 to obtain the operation information. Then, the touch panel detector 32 transmits the operation information by the touch panel to a controller 43.

As shown in FIG. 2, the game apparatus 11 comprises a game space image data storage 31, a viewpoint mover 33, a game space image generator 35, a specific object storage 37, and a specific object position determiner 39. The game apparatus further comprises a specific object controller 41.

An inputter 21 is a device that inputs operation information on a game. Examples of the inputter 21 includes operation buttons 13a-13d, a start switch 15, a selection switch 17, a direction indication switch 19, and a touch panel 30. In FIG. 2, the touch panel 30 is depicted separately from the inputter 21. When a user operates the inputter 21, information on the operation of a game is transmitted into the game apparatus. The game apparatus 11, using the operation information, executes various processing on the game.

The game space image data storage 31 is a device that stores data on a game space displayed on the first display screen 23 and the second display screen 25. The game space, also called as "world", device a game world in the game apparatus of the present invention. Data on a game space includes position information of an object to be displayed, information on the type of an object to be displayed, and image data of an object to be displayed. Examples of an object to be displayed include a background, a building, a landscape, a plant, and a character that appears in a game. The image data is preferably stored as polygon data. The polygon data includes vertex coordinate data, color data, texture data, and transparency data, for example. The device 31 separates and stores objects to be displayed in accordance with the position or area of a player character, for example. An image of a game space (game image) is formed by an object or objects to be displayed or a specific object or objects as described below.

The viewpoint mover 33 is a device that moves a viewpoint in a game space based on the operation information input from the inputter 21. For example, in case operation information on the movement in the upper direction is input from the direction indication switch 19 into the game apparatus, the mover 33 receives the instruction information. Then, the mover 33 transmits the information for moving the viewpoint of a player character in the upper direction to the controller 43. The viewpoint information controlled by the viewpoint mover 33 is the position or direction of a viewpoint.

The game space image generator 35 is a device that reads out image data of a game space from the game space image storage 31 and generates an image of the game space displayed on the first display screen 23 and the second display screen 25, with the use of information on the movement of a viewpoint by the viewpoint mover 33. The game space image generator 35 requests the controller 43 to read out the position of a player character, the area where the player character exists, the room where the player character exists, and the viewpoint of the player character from the player character information storage 45. Then, the controller 43 reads out information on the position or area where the player character exists from the player character information storage 45. The game space image generator 35 obtains information on the viewpoint direction from the viewpoint mover 33. The device 35, by reading out the viewpoint before processing and executing arithmetic operation of adding a viewpoint movement amount to the viewpoint before processing, can obtain information on the viewpoint. Then, the device 35 recognizes the game space displayed on the first display screen 23 and the second display screen 25, with the use of information on the position or viewpoint of a player character. Subsequently, the device 35 reads out information on the image of the game space displayed on the first display screen 23 and the second display screen 25 from the game space image data storage 31. The device 35 transmits information on the image of the game space displayed on the first display screen 23 and the second display screen 25 to the controller 43.

The player character information storage 45 stores, for example, the name of a player character, a life point, the game time (period of time of playing the game), the time in the game (e.g., morning, noon, or night), the degree of game progress, the position of the player character, the area where the player character exists, the room where the player character exists, and the viewpoint of the player character.

The specific object storage 37 is a device that stores information on a specific object existing in a game space. The "specific object" device an object to be processed of the objects existing in a game space which are displayed on the first display screen 23 and are not displayed on the second display screen 25. Examples of a specific object include a treasure box, a door, an enemy, and an item. A specific object may be such that its position or property is changed depending on the degree of game progress. Examples of information on a specific object stored in the device 37 include the type of the specific object, the position of the specific object (3D position), the condition of the specific object, and the processing information on the specific object. An example of the processing information on a specific object is such that the specific object in the nature of an enemy, for example, can be eliminated when pressure is applied to a portion of the touch panel near the enemy.

The specific object position determiner 39 is a device that determines whether a specific object stored in the specific object storage 37 exists in the display region of the first display screen 23 or the display region of the second display screen 25. The controller 43 reads out information on the position or viewpoint of a player character from the player character information storage 45 upon request of the device 39. The device 39 requests the controller 43 to calculate the region which the player character can see (namely, the display region of the first display screen 23 and the display region of the second display screen 25). Upon the request, the controller 43 reads out image information corresponding to the position of the player character from the game space image data storage 31, with the use of information on the position of the player character. Then, the controller 43 calculates the region which the player character can see (namely, the display region of the first display screen 23 and the display region of the second display screen 25). The controller 43 transmits the calculated information on the region which the player character can see to the specific object position determiner 39. On the other hand, the specific object storage 37 stores the positions of each specific object. Thus, the specific object position determiner 39 reads out the position of a specific object from the specific object storage 37. Then, the device 39 determines whether the specific object exists in the display region of the first display screen 23 and the display region of the second display screen 25. The device 39 may determine which of the display region of the first display screen 23 and the display region of the second display screen 25 a specific object exists in. The device 39 may determine only on the preselected specific object with the use of information on the area, room or area a player character exists. The device 39 may first determine whether a specific object exists in the display region of the first display screen 23, and then determine whether the specific object exists in the display region of the second display screen 25. The determination information is output to a specific object controller 41.

The game apparatus 11 according to the first aspect of the present invention further comprises a specific object controller 41. The specific object controller 41 controls to display a specific object on the first display screen 23 in case the specific object position determiner 39 determines that the specific object exists in the display region of the first display screen 23. The controller 41 receives the information that the specific object exists in the display region of the first display screen 23 from the specific object position determiner 39. Then, the controller 41 outputs information for displaying the specific object on the display region of the first display screen 23 to the controller 43. The information includes polygon information of the specific object. The information is transmitted to the first display drive circuit 47 that drives the first display screen 23. Then, the first display drive circuit 47 executes arithmetic processing for displaying the specific object on the first display screen 23 and transmits the arithmetic result to the first display screen 23. Then, the specific object is displayed at a predefined position on the first display screen 23. Sometimes the specific object may exist behind another object when the first display drive circuit 47 calculates the image displayed on the first display screen 23. In this case, the specific object is not displayed on the first display screen 23.

On the other hand, the specific object controller 41 controls not to display or hide the specific object in case the specific object position determiner 39 determines that the specific object exists in the display region of the second display screen 25. The controller 41 receives the information that the specific object exists in the display region of the second display screen 25 from the specific object position determiner 39. Then, the controller 41 transmits information for not displaying the specific object on the second display screen 25 to the controller 43. In this case, the information on the specific object is not transmitted to the second display drive circuit 49 that drives the second display screen 25. Consequently, the specific object is not displayed on the second display screen 25.

Alternatively, the specific object controller 41, in case it receives the information that a specific object exists in the display region of the second display screen 25, may process the game image as described below. Namely, the controller 41 reads out the image information of the specific object from the specific object storage 37. The controller 41 executes a predefined image processing for the read out image information of the specific object. The controller 41, on that basis, transmits the image-processed image information of the specific object to the second display drive circuit 49. Then, the specific object is displayed at a predefined position on the second display screen 25. The predefined image processing is such that the transparency of a specific object is enhanced by multiplying the transparency ($\alpha$). Such processing allows a specific object to be displayed as a transparent or translucent object. Even in this case, the display mode of a specific object can be changed between the first display screen 23 and the second display screen 25. This enables the game apparatus 11 to make effective use of having a plurality of screens and to execute the image processing that attracts users.

Preferably, the game apparatus 11 of the present invention further comprises a specific object contact determiner 51. The determiner 51 determines whether a player character which is the subject of a viewpoint has contacted with a specific object existing in the display region of the first display screen 23 or a specific object existing in the display region of the second display screen 25. The determiner 51 may determine whether a player character has contacted with a specific object existing in the display region of the second display screen 25. Alternatively, the determiner 51 may determine whether a player character has contacted with a specific object existing across both the display regions of the first display screen 23 and the second display screen 25.

The controller 43 reads out information on the position of a player character from the player character information storage 45 upon request of the specific object contact determiner 51. The controller 43 also reads out information on a specific object within a predefined range from the position of a player character from the specific object storage 37 upon request of the specific object contact determiner 51. The information on a specific object includes information of the type and position of the specific object. The information on a specific object may include information on the contact range of the specific object.

The specific object contact determiner 51 calculates the distance between a player character and each specific object from the information on the position of the player character and the information on the position of each specific object. The specific object contact determiner 51 determines whether the distance between the player character and the specific object is within the contact range of the specific object. In case the distance between the player character and the specific object is within the contact range of the specific object, the specific object contact determiner 51 determines that the player character has contacted with the specific object. On the other hand, in case the distance between the player character and the specific object is out of the contact range of the specific object, the specific object contact determiner 51 determines that the player character has not contacted with the specific object.

Another mode of the specific object contact determiner 51 is as described below. The controller 43 reads out information on the positions of a specific object existing in the display region of the first display screen 23 and a specific object existing in the display region of the second display screen 25 upon request of the specific object contact determiner 51. The specific object contact determiner 51 determines, using the information, whether the player character has contacted with the specific object or objects. The information that the player character has contacted with the specific object or objects is transmitted to the controller 43.

The controller 43 reads out the operation information when the player character has contacted with the specific object or objects from the specific object storage 37. Then, the controller 43 operates in accordance with the read out operation information.

Another example of the specific object contact determiner 51 is as described below. The controller 43 reads out information on the position of a player character from the player character information storage 45. The controller 43 also reads out information on the positions of a specific object existing in the display region of the first display screen 23 and a specific object existing in the display region of the second display screen 25. The specific object contact determiner 51, using the information, determines whether the player character has contacted with the specific object or objects. The determiner 51 may determine whether the player character has contacted with the specific object or objects existing in the display region of the second display screen 25. Alternatively, the determiner 51 may determine whether the player character has contacted with the specific object or objects existing across both the display regions of the first display screen 23 and the second display screen 25. The determiner 51 may determine that a player character has contacted with a specific object or objects in case both sides are within a predefined range. The predefined range may be a value corresponding to a specific object. Such a value corresponding to a specific object may be stored in the specific object storage 37. Thus, the specific object contact determiner 51 may determine the presence or absence of the contact with the use of the value corresponding to a specific object stored in the specific object storage 37.

Preferably, the game apparatus 11 of the present invention further comprises a specific object indication determiner 53. The determiner 53, in case it receives indication information from a touch panel, determines whether the indication information from the touch panel indicates a hidden specific object existing in the display region of the second display screen 25. The "indication information" relates to a kind of operation information for indicating an object. The determiner 53 receives information on the position where pressures is applied from the touch panel, for example. Then, the determiner 53 determines whether or not the position where pressure is applied is a responsive region of the specific object. The responsive region of the specific object may be stored in the specific object storage 37. Then, the specific object indication determiner 53 may read out the responsive region corresponding to the specific object stored in the specific object storage 37 for use in arithmetic operation. The specific object indication determiner 53 may determine, using indication information from an inputter other than a touch panel, whether the indication information has indicated a hidden specific object existing in the display region of the second display screen 25. Examples of an inputter 21 other than a touch panel include operation buttons 13a-13d.

In this way, the game apparatus 11 of the present invention executes processing of determining whether a hidden specific object existing in the display region of the second display screen 25 has been indicated. This enables the game apparatus 11 to make effective use of having a plurality of screens and to execute the image processing that attracts users.

Figure 3:
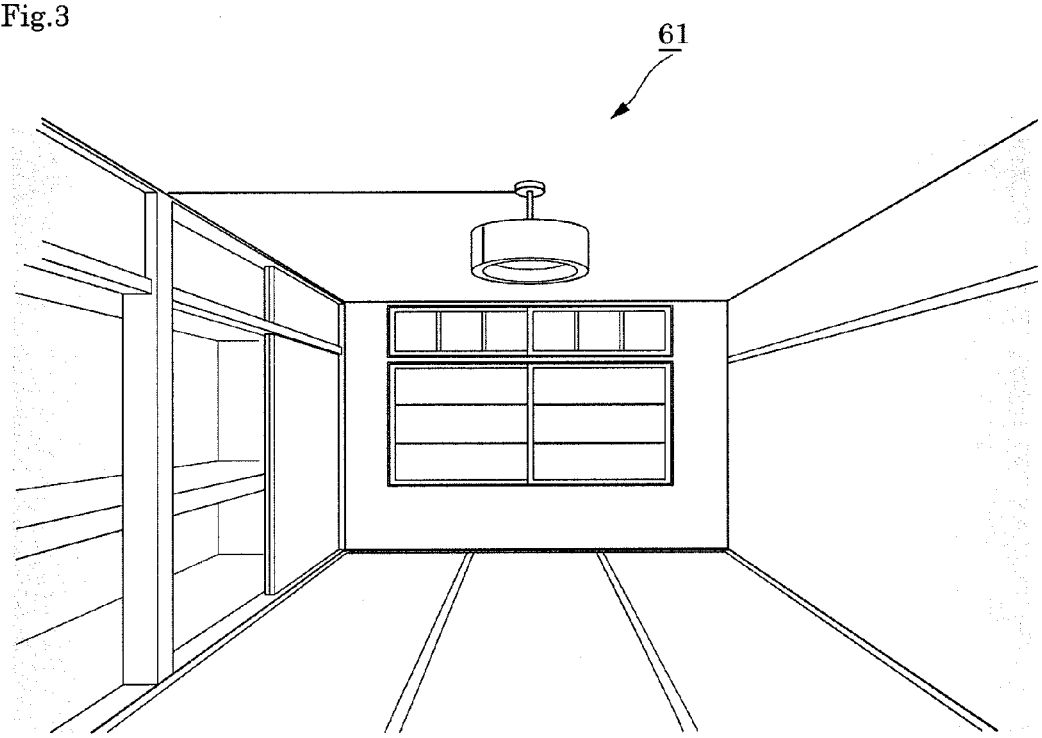
FIG. 3 is a background image of a Japanese-style room ("Washitsu") which is an example of a 3D game image.
Figure 4:
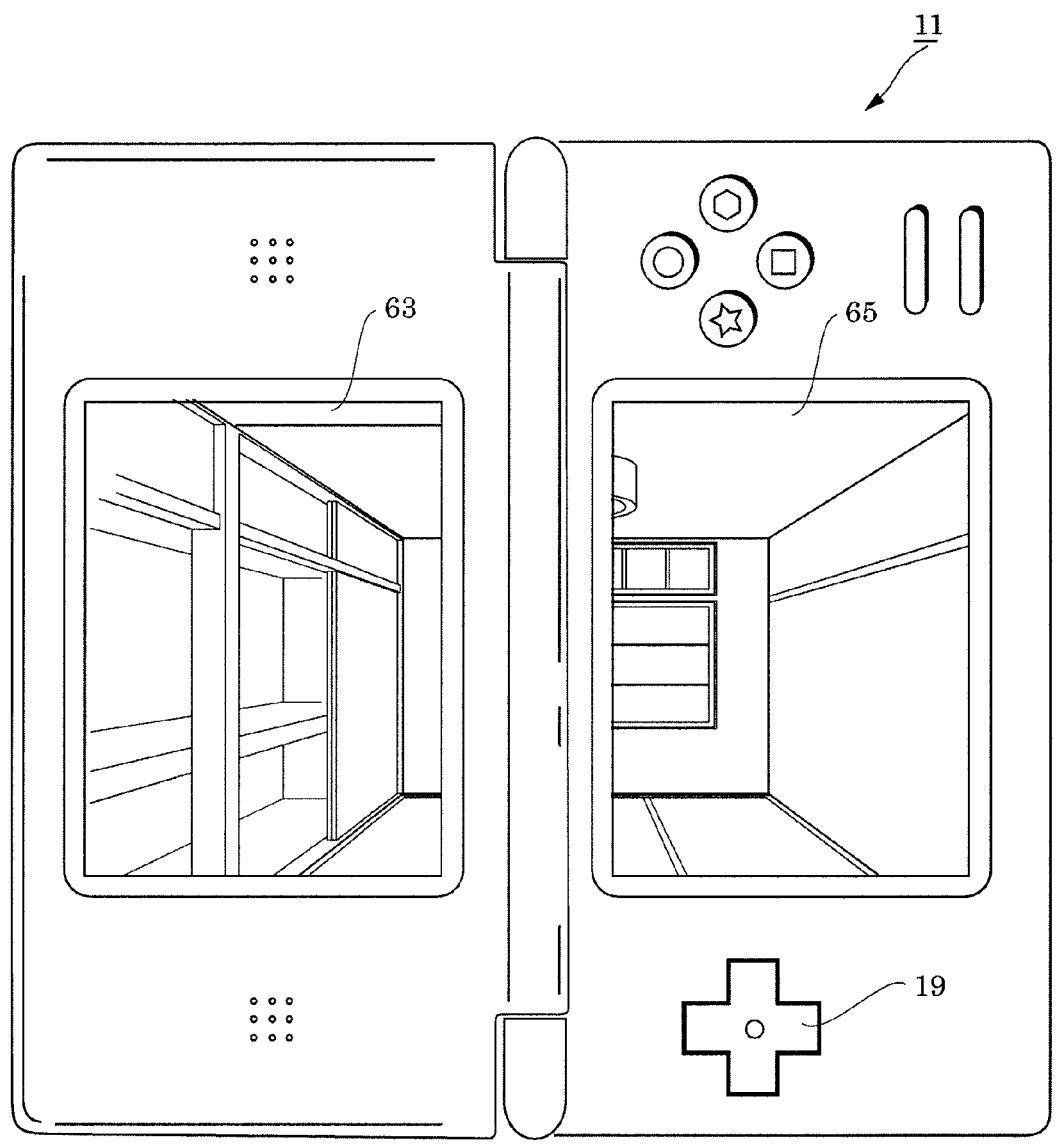
FIG. 4 shows an example where a game apparatus displays the Japanese-style room of FIG. 3.
Figure 5:
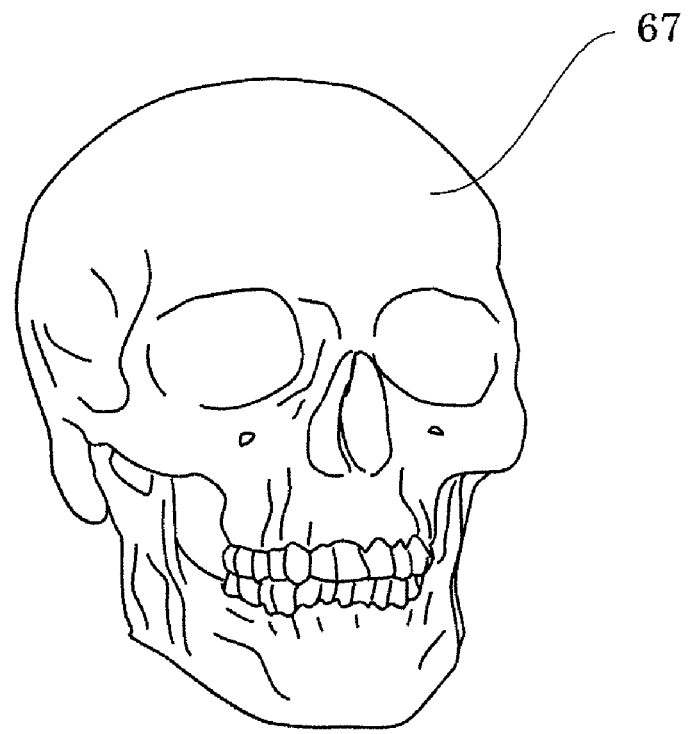
FIG. 5 is an image of a ghost which is an example of a specific object.
Figure 6:
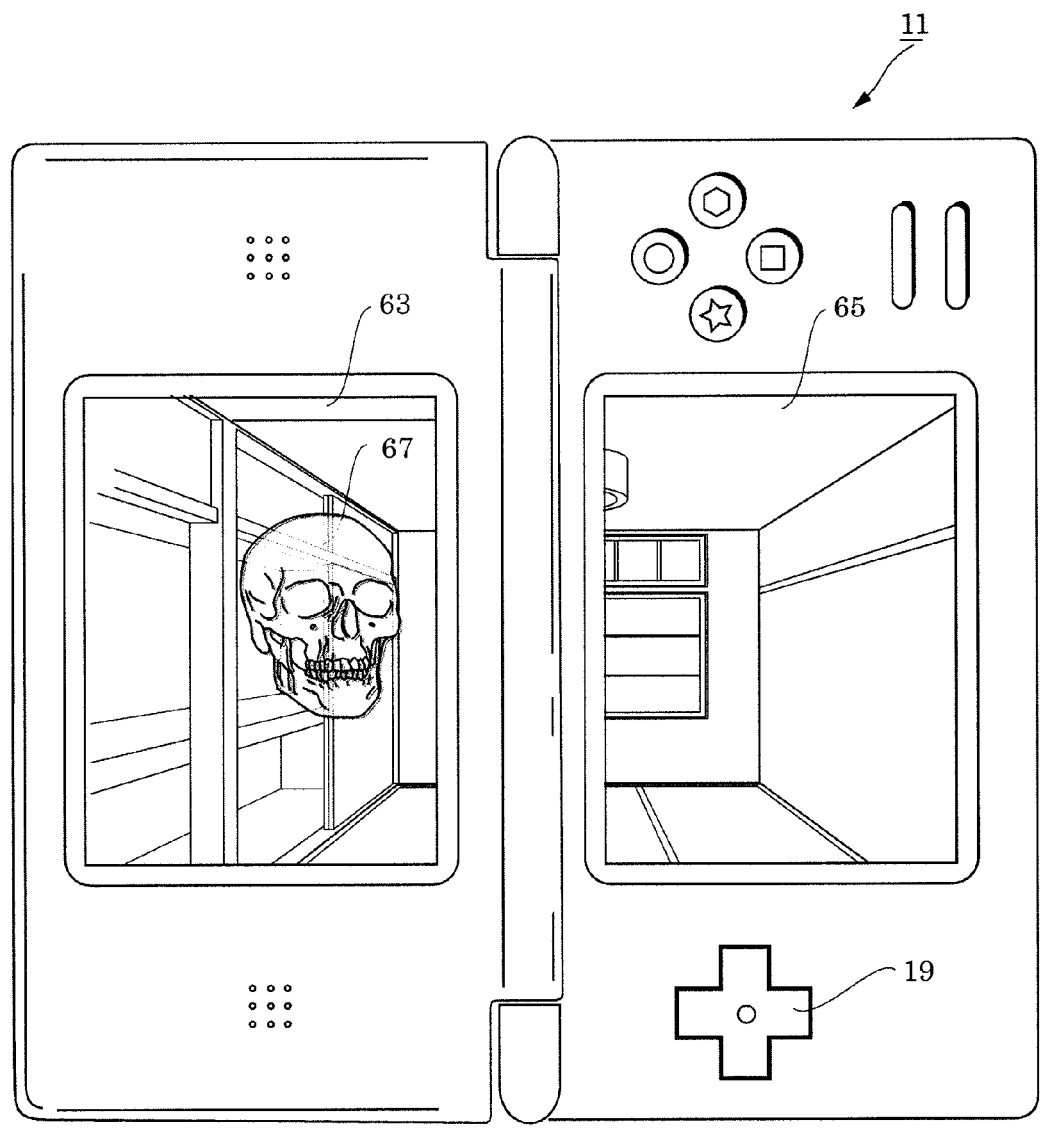
FIG. 6 shows an example where the ghost of FIG. 5 exists in the Japanese-style room of FIG. 4.
Figure 7:
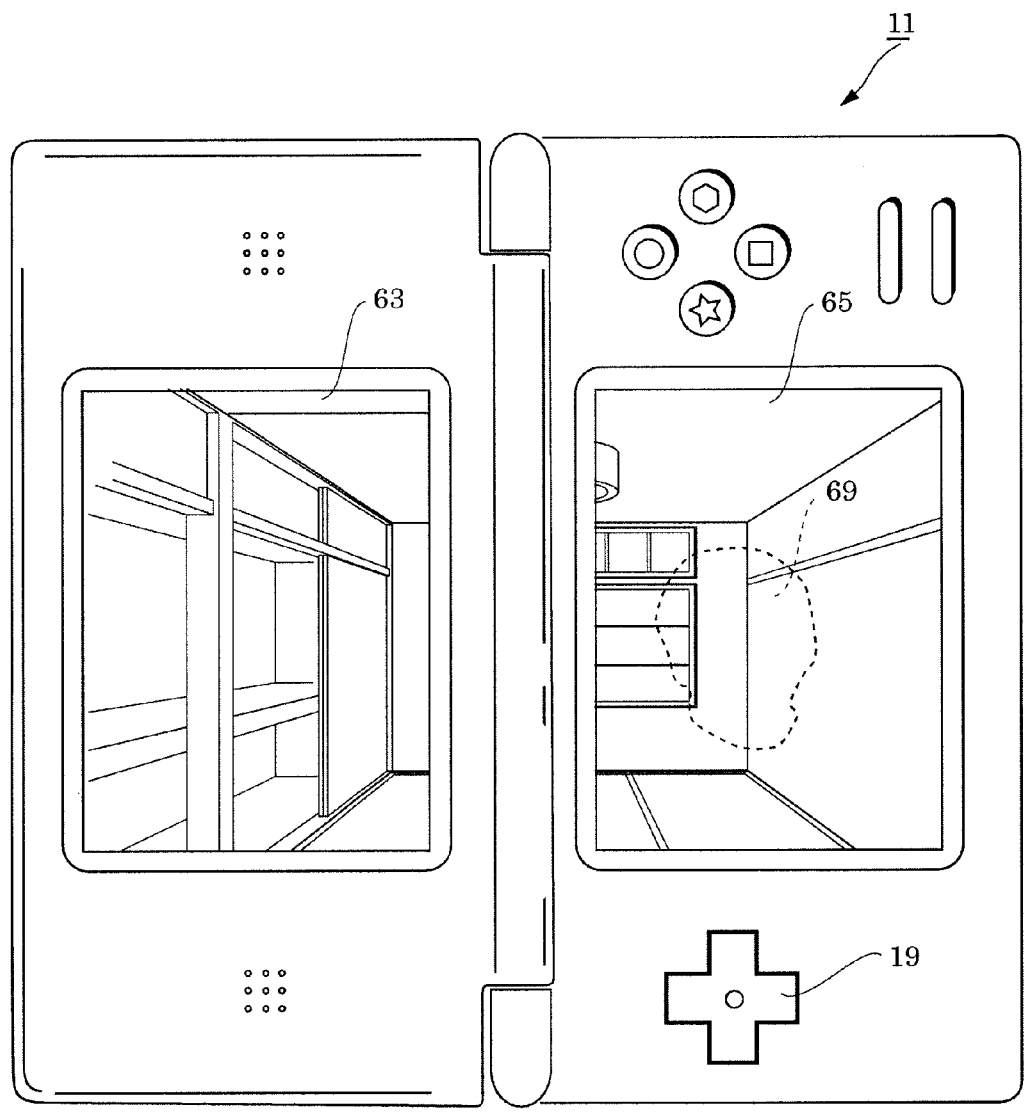
FIG. 7 is a diagram that illustrates the display where the ghost of FIG. 6 has moved.

Next, an operation example of the game apparatus 11 of the present invention will be described using an example of a game image. FIG. 3 is a background image of a Japanese-style room ("Washitsu") which is an example of a 3D game image. FIG. 4 shows an example where a game apparatus displays the Japanese-style room of FIG. 3. FIG. 5 is an image of a ghost which is an example of a specific object. FIG. 6 shows an example where the ghost of FIG. 5 exists in the Japanese-style room of FIG. 4. FIG. 7 is a diagram that illustrates the display where the ghost of FIG. 6 has moved.

The image data for forming the background image of the Japanese-style room shown in FIG. 3 is stored in the game space image data storage 31. The game space image generator 35 obtains the image data including the Japanese-style room of FIG. 3 from the game space image data storage 31, with the use of information on the position or area where a player character exists. Then, the generator 35 obtains information on the image of the game space displayed on the first display screen 23 and the second display screen 25, with the use of information on the viewpoint of the player character. The information is transmitted to the controller 43. The controller 43 executes arithmetic processing that calculates the image displayed on the first display screen 23 and the image displayed on the second display screen 25.

The controller 43 transmits information on the image displayed on the first display screen 23 to the first display drive circuit 47 that drives the first display screen 23. Then, the first display drive circuit 47 executes arithmetic processing that displays the image of the Japanese-style room 61 on the first display screen 23. The first display drive circuit 47 transmits the arithmetic result to the first display screen 23. Then, the left part of the Japanese-style room 63 is displayed on the first display screen 23.

On the other hand, the controller 43 transmits information on the image displayed on the second display screen 25 to the second display drive circuit 49 that drives the second display screen 25. Then, the second display drive circuit 49 executes arithmetic processing that displays the Japanese-style room on the second display screen 25. The second display drive circuit 49 transmits the arithmetic result to the second display screen 25. Then, the right part of the Japanese-style room 65 is displayed on the second display screen 25.

In this way, the game apparatus 11 displays the game image shown in FIG. 4 on the first display screen 23 and the second display screen 25.

The data on the specific object shown in FIG. 5 is stored in the specific object storage 37. The specific object position determiner 39 receives information on the region which a player character can see (namely, the display region of the first display screen 23 and the display region of the second display screen 25). The determiner 39, using the received information on the region which a player character can see, determines whether the specific object ghost 67 exists in the display region of the first display screen 23 and/or the display region of the second display screen 25. The determination information is output to the specific object controller 41.

In case the specific object position determiner 39 determines that the ghost 67 exists in the display region of the first display screen 23, the specific object controller 41 controls to display the ghost 67 on the first display screen 23. Namely, the specific object controller 41 outputs the polygon information on the ghost 67 to the controller 43. The controller 43 transmits the polygon information on the ghost 67 to the first display drive circuit 47. Then, the first display drive circuit 47 executes arithmetic processing that displays the ghost 67 on the first display screen 23. The first display drive circuit 47 transmits the arithmetic result to the first display screen 23. Then, the ghost 67 is displayed at a predefined position on the first display screen 23. In this way, the game image as shown in FIG. 6 can be obtained. FIG. 6 depicts the ghost 67 existing at the left part of the Japanese-style room 63.

On the other hand, in case the specific object position determiner 39 determines that the ghost 67 exists in the display region of the second display screen 25, the specific object controller 41 controls not to display the ghost 67 on the second display screen 25. Also in this case, the specific object controller 41 outputs the polygon information on the ghost 67 to the controller 43. The game apparatus 11 does not display the ghost 67 on the second display screen 25. Therefore, only the information on the type of the ghost 67 (type of a specific object) and the position of the ghost 67 may be transmitted to the controller 43. In that case, the ghost 67 exists in the display region of the second display screen 25 in terms of the game but is not displayed on the second display screen 25. FIG. 7 depicts the invisible ghost 67 while existing at the right part of the Japanese-style room 65. In FIG. 7, numeral 69 indicates the hidden ghost. In this way, the game apparatus 11 of the present invention can display a specific object on one display screen and not display it on the other display screen.

Next, an operation example in determining whether a player character has contacted with a specific object will be described. The ghost 67 in FIG. 6 and the invisible ghost 69 in FIG. 7 are set to move along with the game's progress. A player character also moves in a 3D game space based on the operation information from the inputter 21.

The specific object contact determiner 51 requests the controller 43 to read out information on the position of a player character from the player character information storage 45. Then, the controller 43 reads out information on the position of a player character from the player character information storage 45.

Next, the specific object contact determiner 51 requests the controller 43 to read out information on a specific object within a predefined range from the position of the player character from the specific object storage 37.

Then, the controller 43 reads out the information that the specific object is the invisible ghost 69 in FIG. 7, the information on the invisible ghost 69, and the contact range of the invisible ghost 69.

The specific object contact determiner 51 calculates the distance between the player character and the invisible ghost 69 from the information on the position of the player character and the information on the position of the invisible ghost 69. Then, the specific object contact determiner 51 determines whether the distance between the player character and the invisible ghost 69 is included in the contract range of the invisible ghost 69.

In case the distance between the player character and the invisible ghost 69 is included in the contract range of the invisible ghost 69, the specific object contact determiner 51 determines that the player character has contacted with the specific object.

The information that the player character has contacted with the invisible ghost 69 is transmitted to the controller 43.

The controller 43 reads out the operation information when the player character has contacted with the invisible ghost 69 from the specific object storage 37.

In case the operation information when the player character has contacted with the invisible ghost 69 is such as "make the game over", the controller 43 executes processing for making the game over.

Next, an operation example in determining whether a hidden specific object existing in the display region of the second display screen 25 has been indicated will be described.

The controller 43 receives indication information from the touch panel 30. Then, the specific object indication determiner 53 executes processing for determining whether a hidden specific object exists in the display region of the second display screen 25.

In case of FIG. 6, the invisible ghost 69 exists in the display region of the second display screen 25.

The specific object indication determiner 53 executes processing for reading out information on the position of the invisible ghost 69 and the responsive region of the invisible ghost 69.

The specific object indication determiner 53 executes processing for determining whether the position where pressure is applied from the touch panel is included in the responsive region of the invisible ghost 69.

In case the position where pressure is applied from the touch panel is included in the responsive region of the invisible ghost 69, the controller 43 executes processing for eliminating the invisible ghost 69, for example.

Figure 8:
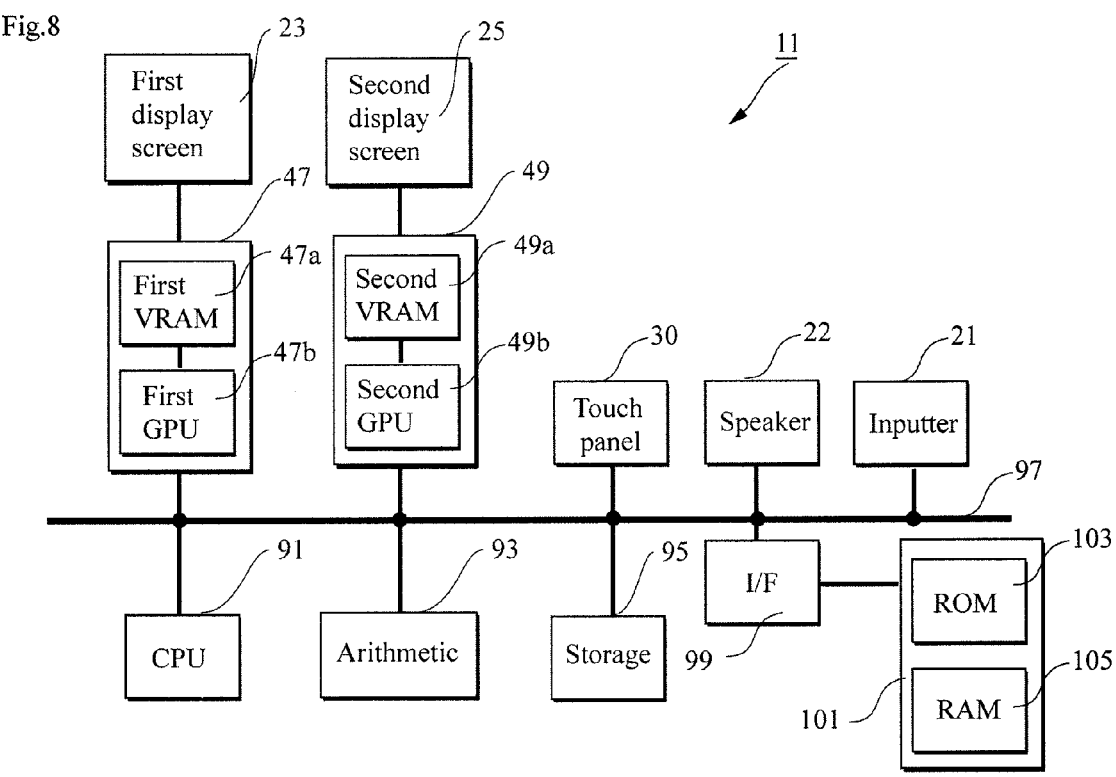
FIG. 8 is a block diagram of a game apparatus according to an embodiment of the present invention.

FIG. 8 is a block diagram of a game apparatus according to an embodiment of the present invention. The game apparatus 11 comprises an inputter 21, a speaker 22, a touch panel 30, a CPU 91, an arithmetic part 93 and a storage part 95. The respective components are connected together via a bus 97 for transmission/reception of information. Examples of the inputter 21 includes operation buttons 13*a*-13*d*, a start switch 15, a selection switch 17, and a direction indication switch 19 as shown in FIG. 1. The game apparatus 11 comprises a first display screen 23 and a second display screen 25. The first display screen 23 and the second display screen 25 are connected to the bus 97 via a first display drive circuit 47 and a second display drive circuit 49, respectively. The game apparatus 11 comprises the touch panel 30 on the second display screen 25. The CPU 91 of this game apparatus 11 is connected to an external interface 99 via the bus 97. An example of the external interface 99 is a slot into which a game card 101 is inserted. The game card 101 comprises a ROM 103 and a ROM 105. The game program of the present invention may be stored in the ROM 103 within the game card 101. The first display drive circuit 47 comprises a first graphics processing unit (GPU) 47*a* and a first video RAM (VRAM) 47*b*. The first GPU 47*a* and the first VRAM 47*b* are connected for transmission/reception of information. The second display drive circuit 49 comprises a second graphics processing unit (GPU) 49*a* and a second video RAM (VRAM) 49*b*. The second GPU 49*a* and the second VRAM 49*b* are connected for transmission/reception of information.

In this embodiment, the CPU 91, the arithmetic device 93, the working area of the storage 95, and the game program stored in the ROM 103 serve as a touch panel detector 32, a viewpoint mover 33, a game space image generator 35, a specific object position determiner 39, a specific object controller 41, a controller 43, a specific object contact determiner 51, and a specific object indication determiner 53. And the storage 95 serves as a game space image data storage 31, a specific object storage 37, and a player character information storage 45.

Next, an example of the basic operation of the game apparatus 11 will be described. Operation information is input from the touch panel 30 or the inputter 21. The input information is transmitted to the CPU 91 via the bus 97. The CPU 91 reads out a game program from the ROM 103. The CPU 91 executes necessary arithmetic processing based on the instructions from the game program. For example, the CPU 91 reads out necessary information from the storage 95. On the other hand, the CPU 91, using the read out information, executes necessary arithmetic processing at the arithmetic device 93. The CPU 91 stores the obtained arithmetic result in the working area of the storage 95. Then, the CPU 91 outputs the arithmetic result to appropriate components via the bus 97.

Next, an example of image display processing executed by the game apparatus 11 will be described. Operation information for moving a viewpoint is input from the direction indication switch 19 to the game apparatus 11. The CPU 91 receives the operation information via the bus 97. The CPU 91 reads out information on the current viewpoint stored in the storage 95. The CPU 91, using the read out current viewpoint and the operation information, executes arithmetic processing for moving the viewpoint in the game space. The CPU 91 reads out the current game image from the storage 11 and, using the information on the movement of the viewpoint, generates an image of the game space displayed on the first display screen 23 and the second display screen 25.

The CPU 91, using information on the position or area where a player character exists stored in the storage 95, obtains image data displayed on the first display screen 23 and the second display screen 25 from the storage 95. The CPU 91 executes arithmetic processing for executing image displayed on the first display screen 23 and the image displayed on the second display screen 25. The CPU 91 transmits information on the image displayed on the first display screen 23 to the first display drive circuit 47. The first GPU 47*a* receiving the image information, using the first VRAM 47*b* as a working area, executes arithmetic processing on the image displayed on the first display screen 23. In this way, the image is displayed on the first display screen 23. The same image processing is executed on the second display screen 25 as is done on the first display screen 23.

Next, an example of image display processing executed on a specific object by the game apparatus 11 will be described. The CPU 91 reads out information on a player character and information on a specific object from the storage 95. The information includes information on the position of a player character and the information on the position of a specific object. The CPU 91 obtains information on the first display screen 23 and the second display screen 25 from the information on the player character. Then, the CPU 91 determines whether the specific object is within a range which the player character can see (namely, the display region of the first display screen 23 and the display region of the second display screen 25).

In case the CPU 91 determines that the specific object exists in the display region of the first display screen 23, the CPU 91 outputs information on the specific object to the first display drive circuit 47. The first CPU 47a, using the information on the background image displayed on the first display screen 23 and the information on the specific object, executes arithmetic processing for calculating the game image displayed on the first display screen 23.

On the other hand, in case the CPU 91 determines that the specific object exists in the display region of the second display screen 25, the CPU 91 controls not to display the specific object on the second display screen 25.

Figure 9:
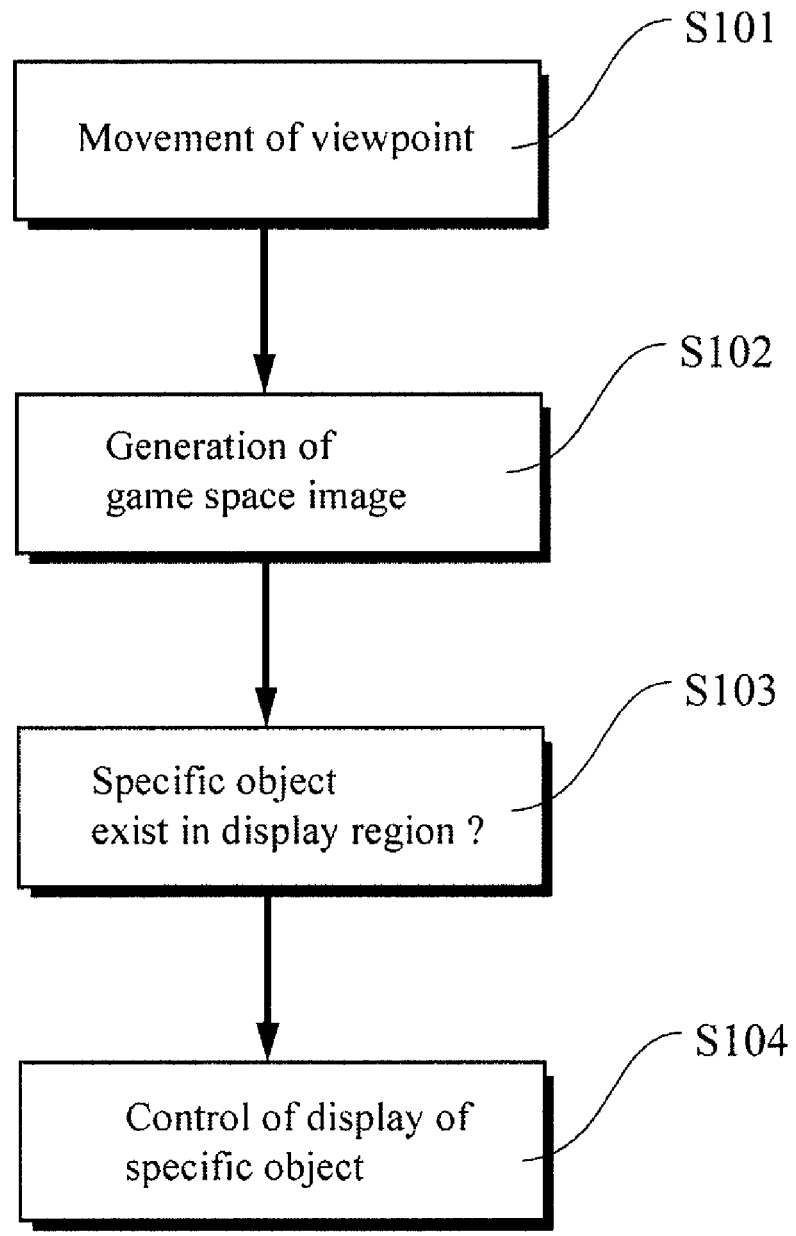
FIG. 9 is a flow chart that illustrates an example of basic steps when the game program of the present invention determines whether a specific object is displayed or hidden.
Figure 10:
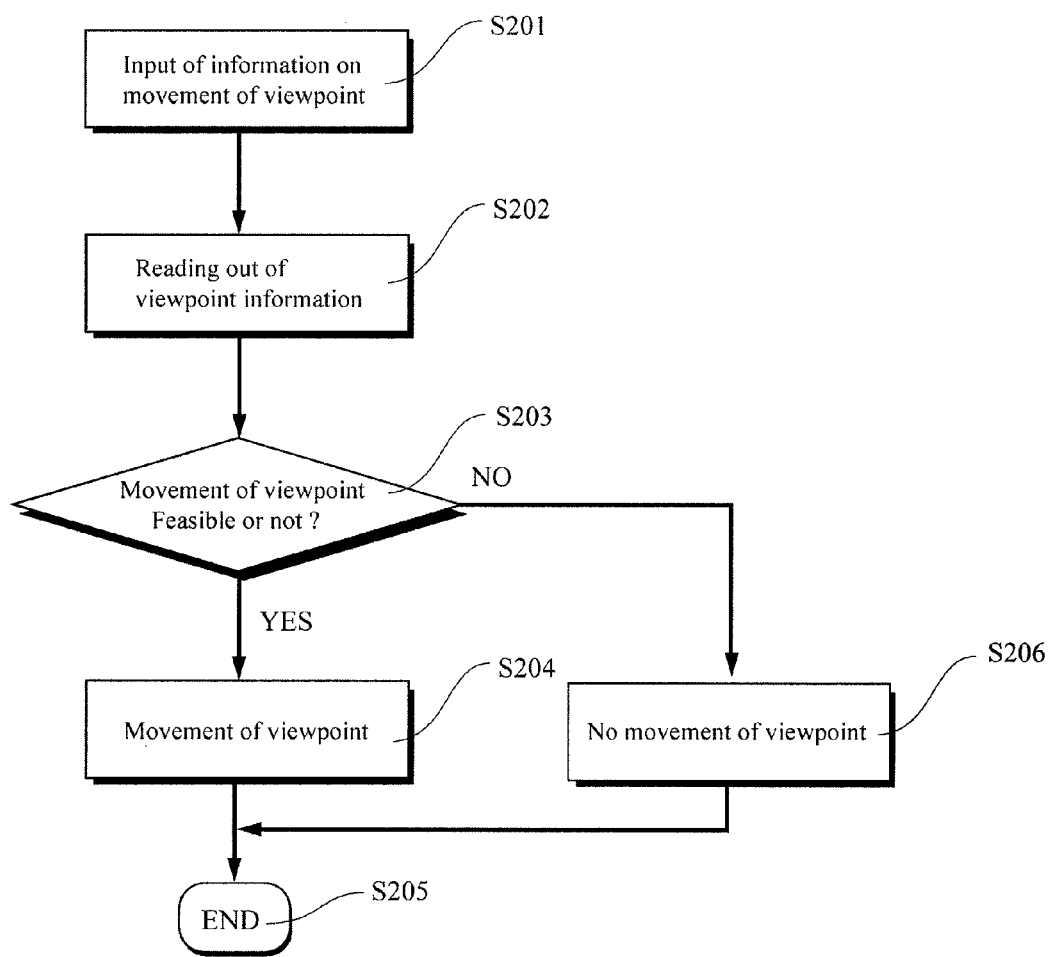
FIG. 10 is a flow chart that illustrates an example of processing for moving the viewpoint of a player character.
Figure 11:
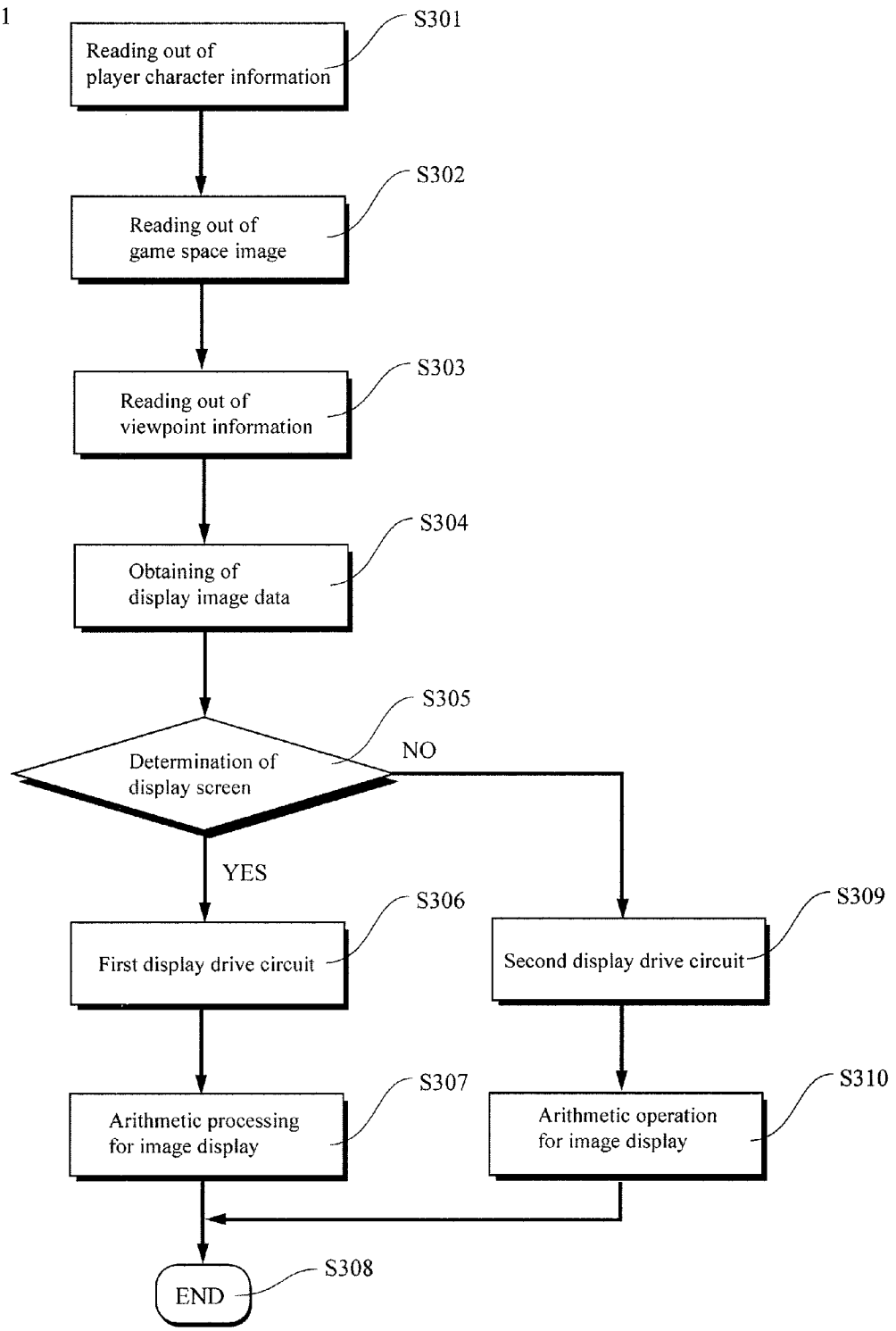
FIG. 11 is a flow chart that illustrates an example of processing for generating an image of a game space.
Figure 12:
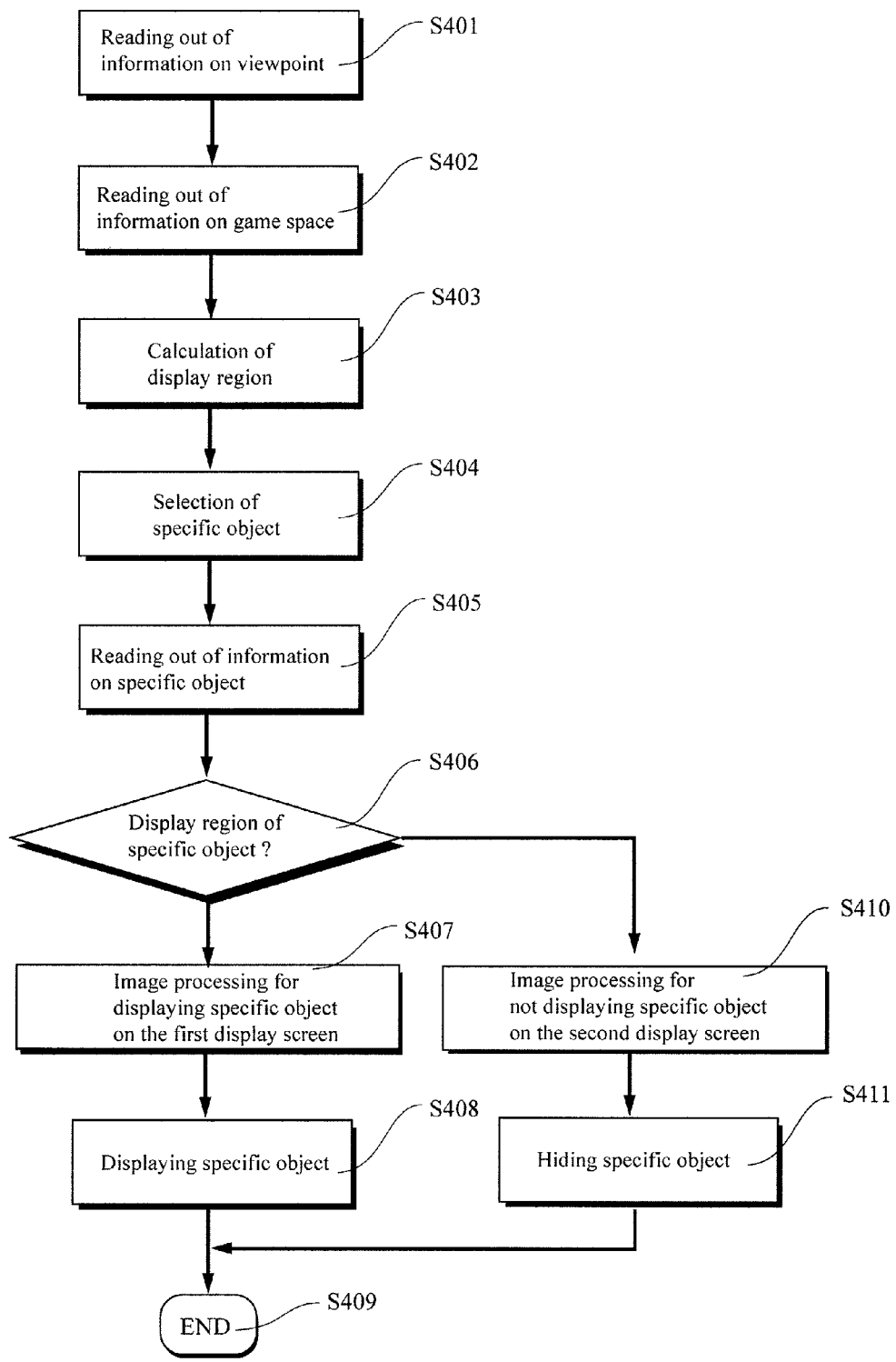
FIG. 12 is a flow chart that illustrates processing for determining whether a specific object is displayed or hidden.
Figure 13:
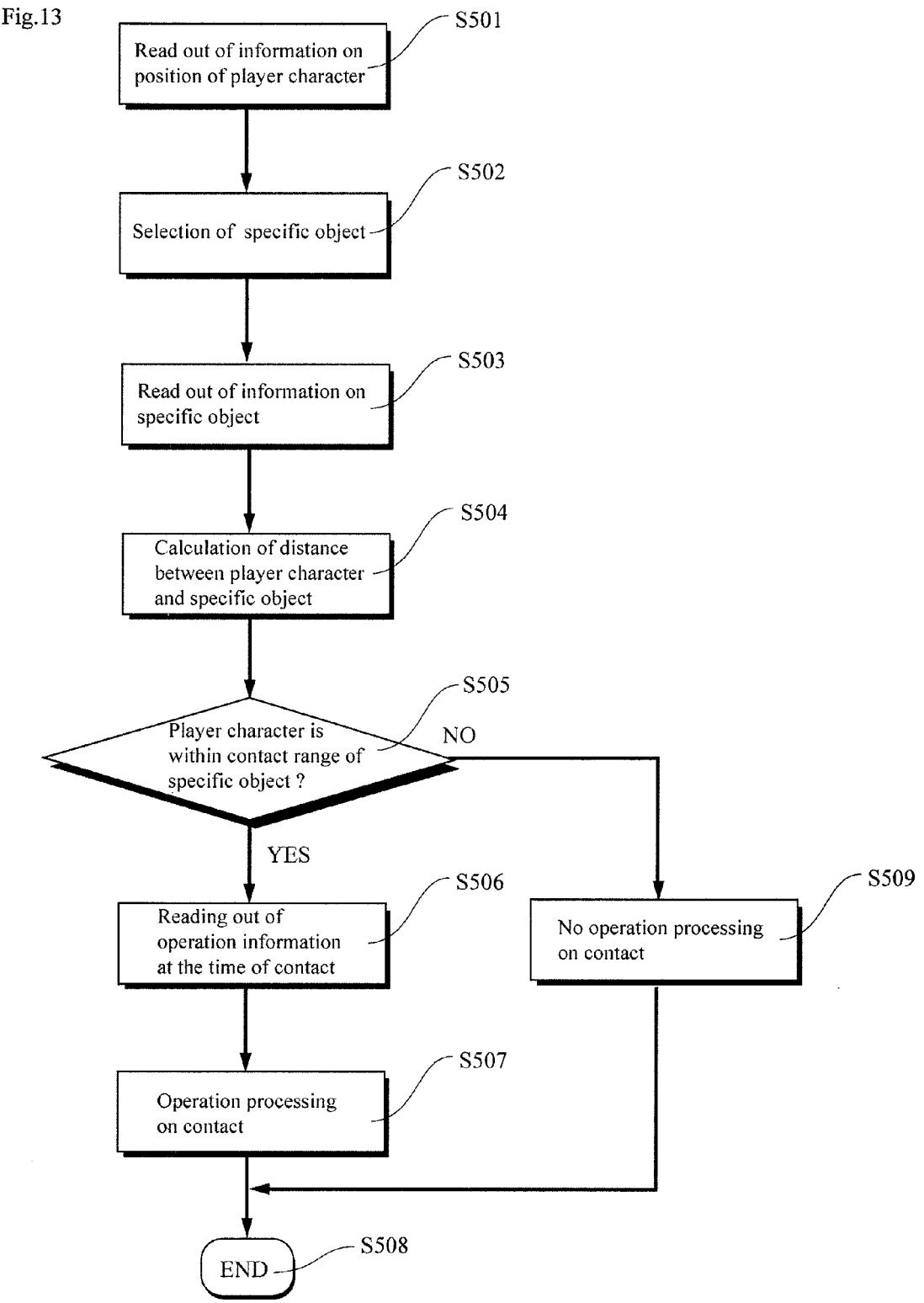
FIG. 13 is a flow chart that illustrates processing that determines whether a player character has contacted with a specific object existing in the display region of the second display screen.
Figure 14:
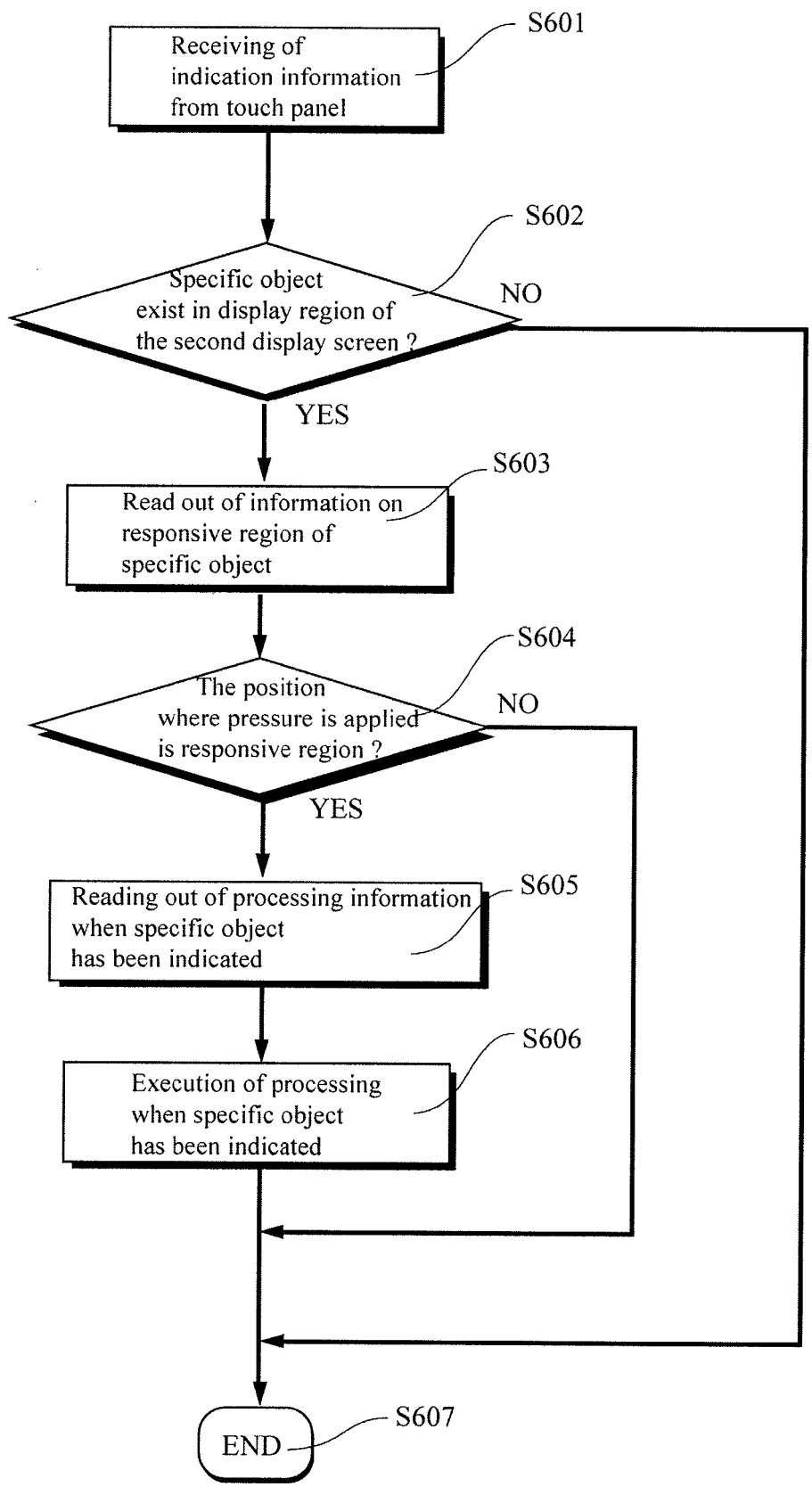
FIG. 14 is a flow chart that illustrates processing for determining whether a hidden specific object existing in the display region of the second display screen has been indicated.

Next, an example of processing executed by the game apparatus 11 whereon a game program is mounted will be described using the flow charts shown in FIGS. 9 to 14. FIG. 9 is a flow chart that illustrates an example of basic steps when the game program of the present invention determines whether a specific object is displayed or hidden. FIG. 10 is a flow chart that illustrates an example of processing for moving the viewpoint of a player character. FIG. 11 is a flow chart that illustrates an example of processing for generating an image of a game space. FIG. 12 is a flow chart that for illustrates processing for determining whether a specific object is displayed or hidden. FIG. 13 is a flow chart that illustrates processing for determining whether a player character has contacted with a specific object existing in the display region of the second display screen 25. FIG. 14 is a flow chart that illustrates processing for determining whether a hidden specific object existing in the display region of the second display screen 25 has been indicated. "S" in the figures indicates a step.

As shown in FIG. 9, basic steps in determining whether a specific object of a game program of the present invention is displayed or hidden are as described below. First, the viewpoint in a game space is moved based on the operation information input from the inputter 21 (step 101). The image of the game space displayed on the first display screen 23 and the second display screen 25 is generated using information on the movement of the viewpoint (step 102). It is determined whether a specific object in the game space exists in the display region of the first display screen 23 or the display region of the second display screen 25 (step 103). In case the specific object is determined to exist in the display region of the first display screen 23, the specific object is controlled to be displayed, whereas, in case the specific object is determined to exist in the display region of the second display screen 25, the specific object is controlled to be hidden (step 104).

An example of processing for moving the viewpoint of a player character will be described using FIG. 10. Information on the movement of a viewpoint is input from the direction indication switch 19 (step 201). After the operation information on the movement of the viewpoint is input, the CPU 91 reads out information on the current viewpoint of a player character from the storage 95 (step 202). The CPU 91, using the arithmetic device 93, determines whether the movement of the viewpoint input at step 201 is feasible (step 203). In case the CPU 91 determines that the movement of the viewpoint is feasible, processing for moving the viewpoint is executed (step 204). This brings an end to processing for moving the viewpoint of a player character (step 205). On the other hand, in case the CPU 91 determines at step 203 that the movement of the viewpoint is not feasible, the viewpoint is not moved (step 206). This brings an end to processing on the viewpoint of a player character (step 205).

An example of processing at step 203 will be described. As an example, information on the viewpoint read out at step 202 is such that the current viewpoint is at the uppermost position. Furthermore, information on the movement of the viewpoint read out at step 201 is such that the viewpoint is to be moved upward. In this case, the viewpoint cannot be moved upward. Therefore, the CPU 91 determines at step 203 that the viewpoint cannot be moved. In this case, the current step moves on to step 206 without viewpoint movement, and the processing on the viewpoint of a player character is ended (step 205).

An example of processing for generating an image of a game space will be described using FIG. 11. During the progress of a game, the CPU 91 reads out information on the position, area or room where a player character exists from the storage 95 (step 301). The CPU 91, using the read out information, reads out the image data of the game space that may be displayed in relation to the current position of the player character from the storage 95 (step 302). The CPU 91 reads out information on the viewpoint of the player character (step 303). Step 303 may be executed concurrently with step 301. The CPU 91, using the information on the viewpoint of the player character obtained at step 303 and the image data of the game space obtained at step 302, obtains the image data displayed on the first display screen 23 and the second display screen 25 (step 304). The method for obtaining image data is well-known. For example, a game space may be controlled to be displayed by perspective projection based on the viewpoint of a player character.

The CPU 91 determines whether each image included in the image data obtained at step 304 is the image data displayed on the first display screen 23 or the image data displayed on the second display screen 25 (step 305). The determination can be made using the positions of the vertices which constitute polygons. The determination also can be made using the position information of each pixel. Namely, the data displayed on the first display screen 23 and the data displayed on the second display screen 25 may be extracted from the images obtained at step 304. The CPU 91 transmits information on the image displayed on the first display screen 23 to the first display drive circuit 47 (step 306). The first GPU 47a receiving the image information, using the first VRAM 47b as a working area, executes arithmetic processing on the image displayed on the first display screen 23 (step 307). Thus, the image is displayed on the first display screen 23. This brings an end to the image processing on a game space (step 308). In case the image is determined to be displayed on the second display screen 25, the same image processing as described above is executed (steps 309 and 310).

An example of processing in determining whether a specific object is displayed or hidden will be described using FIG. 12. The CPU 91 reads out information on the position, the area and room where a player character exists and information on the viewpoint of the player character (step 401). The CPU 91 reads out information on the game space from the storage 95 (step 402). The information on the game space is associated with the information on the position, area and room where the player character exists. An example of information on a game space is information on the room where a player character exists. The information on a room is, for example, information on the polygons which constitute the walls of the room. The CPU 91 instructs the arithmetic device 93 to obtain information on the display region of the first display screen 23 and the display region of the second display screen 25 with the use of the information on the player character and the information on the game space. In this way, the display region of the first display screen 23 and the display region of the second display screen 25 can be obtained (step 403).

The CPU 91, using the information on the display regions obtained at step 403 and the position information of the specific object stored in the storage 95, selects the specific object existing in the display region or regions (step 404).

The CPU 91 reads out information on the specific object selected at step 404 from the storage 95 (step 405). Information on a specific object includes information on the type of the specific object and the position of the specific object.

The CPU 91, using the information on the specific object read out at step 405, determines whether or not the specific object selected at step 404 is included in the region which the player character can see (namely, the display region of the first display screen 23 and the display region of the second display screen 25) (step 406). Namely, the CPU 91 determines whether the specific object exists in the display region of the first display screen 23 or exists in the display region of the second display screen 25.

In case the specific object is determined at step 406 to exist in the display region of the first display screen 23, processing for displaying the specific object on the first display screen 23 is executed (step 407). The CPU 91 outputs information on the specific object to the first display drive circuit 47. The first GPU 47a, using the information on the background image displayed on the first display screen 23 and the information on the specific object, executes arithmetic processing for calculating the game image displayed on the first display screen 23. The arithmetic result is transmitted to the first display screen 23.

Consequently, the specific object is displayed on the first display screen 23 (step 408). This brings an end to the processing on displaying a specific object (step 409).

On the other hand, in case the specific object is determined to exist in the display region of the second display screen 25, processing for not displaying the specific object on the second display screen 25 is executed (step 410). Consequently, an image not including the specific object is displayed on the second display screen 25 (step 411). This brings an end to the processing on displaying a specific object (step 409).

An example of processing for determining whether a player character has contacted with a specific object existing in the display region of the second display screen 25 will be described using FIG. 13. The CPU 91 reads out information on the position of a player character from the storage 95 (step 501). The CPU 91 also selects a specific object within a predefined range from the position of the player character from the specific objects stored in the storage 95 (step 502). The CPU 91 reads out information on the specific object or objects selected at step 502 (step 503). The CPU 91, using the arithmetic device 93, executes arithmetic processing for calculating the distance between the player character and the specific object or objects from the information on the position of the player character and the information on each specific object (step 504). The CPU 91 temporarily stores the calculated distance in the storage 95. The CPU 91 instructs the arithmetic device 93 to execute arithmetic processing for determining whether the calculated distance is included in the contact range of the specific object or objects (step 505). In case the arithmetic result by the arithmetic device 93 shows that the calculated distance is included in the contact range of the specific object or objects, the CPU 91 reads out the operation information when the player character has contacted with the specific object or objects from the storage 95 (step 506). Then, the CPU 91 executes operation processing in accordance with the read out operation information (step 507). This brings an end to the processing when the player character has contacted with the specific object or objects (step 508). On the other hand, in case it is determined at step 505 that the player character has not contacted with the specific object or objects, the processing when the player character has contacted with the specific object or objects is not executed (step 509). This brings an end to the processing (step 508).

An example of information processing in determining whether a hidden specific object existing in the display region of the second display screen 25 has been indicated will be described using FIG. 14.

The CPU 91 receives indication information from the touch panel 30 (step 601). The CPU 91 executes processing for determining whether or not a specific object exists in the display region of the second display screen 25 (step 602).

In case the CPU 91 determines at step 602 that a specific object exists in the display region of the second display screen 25, the CPU 91 reads out the responsive region corresponding to the specific object from the storage 95 (step 603). The CPU executes processing for determining whether or not the position where pressure is applied is within the responsive region of the specific object (step 604).

In case the position where pressure is applied is within the responsive region of the specific object, the CPU 91 reads out information on the processing when the specific object has been indicated from the storage 95 (step 605).

Then, the CPU 91 executes processing for proceeding with the game using information on the processing when the specific object has been indicated (step 606).

This brings an end to the progressing when a hidden specific object has been indicated (step 607).

In case the CPU 91 determines at step 602 that a specific object does not exist in the display region of the second display screen 25, processing on a hidden specific object is ended without executing particular processing (step 607).

In case the position where pressure is applied is determined not to be the responsive region of a specific object, processing on a hidden specific object is ended without executing particular processing (step 607).

INDUSTRIAL APPLICABILITY

The present invention can be used in the game industry.

EXPLANATION OF NUMERALS

11 Game apparatus
13a-13d Operation buttons
15 Start switch
17 Selection switch
19 Direction indication switch
21 Inputter
22 Speaker
23 First display screen
24 First housing
25 Second display screen
26 Second housing
28 Connection part
30 Touch panel
31 Game space image data storage
32 Touch panel detector
33 Viewpoint mover
35 Game space image generator
37 Specific object storage
39 Specific object position determiner
41 Specific object controller
43 Controller
45 Player character information storage
47 First display drive circuit
47a First CPU
47b First VRAM
49 Second display drive circuit
49a Second CPU 49b Second VRAM
51 Specific object contact determiner
53 Specific object indication determiner
61 Image of a Japanese-style room
63 Left part of a Japanese-style room
65 Right part of a Japanese-style room
67 Ghost
69 Hidden ghost
91 CPU
93 Arithmetic device
95 Storage
97 Bus
99 External interface
101 Game card
103 ROM
105 RAM

The invention claimed is:

1. A game apparatus, comprising:
an inputter that inputs operation information regarding a game;
a first display screen and a second display screen that display different display regions of a game space, the first display screen displaying a first display region of the display regions and the second display screen displaying a second display region of the display regions, the first display region and the second display region being different regions of the game space and not overlapping;
a game space image data storage that stores image data of the display regions displayed on the first display screen and the second display screen;
a viewpoint mover that moves a viewpoint in the game space based on the operation information input by the inputter;
a game space image generator that reads out the image data of the display regions from the game space image storage and generates images of the display regions displayed on the first display screen and the second display screen, based on movement information on movement of the viewpoint moved by the viewpoint mover;
a specific object storage that stores specific information on a specific object existing in one of the display regions, parts of the specific object existing;
a specific object position determiner that determines whether the specific object stored in the specific object storage exists in the first display region of the first display screen and determines whether the specific object exists in the second display region of the second display screen; and
a specific object display controller,
wherein the specific object display controller displays the specific object on the first display screen when the specific object position determiner determines that the specific object exists in the first display region of the first display screen and the specific object display controller hides the specific object on the second display screen when the specific object position determiner determines that the specific object exists in the second display region of the second display screen.

2. The game apparatus as claimed in claim 1, further comprising:
a specific object contact determiner that determines whether a player character, which is a subject of the viewpoint, has contacted with the specific object existing in the first display region and displayed on the first display screen and has contacted with the specific object existing in the second display region and hidden on the second display screen.

3. The game apparatus as claimed in claim 1,
wherein the second display screen has a touch panel, and
the game apparatus further comprises a specific object indication determiner that determines whether indication information received from the touch panel indicates the specific object that exists in the second display region and is hidden on the second display screen.

4. A method for executing a game program for a game apparatus comprising an inputter that inputs operation information on a game, a first display screen and a second display screen that display different display regions of a game space, and a computer, the method comprising:
moving a viewpoint in the game space based on the operation information input by the inputter;
generating images of the display regions displayed on the first display screen and the second display screen, based on movement information on movement of the viewpoint, the first display screen displaying a first display region of the display regions and the second display screen displaying a second display region of the display regions, the first display region and the second display region being different regions of the game space and not overlapping;
determining whether a specific object that exists in the game space exists in the first display region of the first display screen and determining whether the specific object exists in the second display region of the second display screen; and
displaying the specific object on the first display screen when the specific object is determined to exist in the first display region of the first display screen and hiding the specific object on the second display screen when the specific object is determined to exist in the second display region of the second display screen.

5. The method as claimed in claim 4, further comprising:
determining whether a player character, which is a subject of the viewpoint, has contacted with the specific object existing in the first display region and displayed on the first display screen and has contacted with the specific object existing in the second display region and hidden on the second display screen.

6. The method as claimed in claim 4,
wherein the second display screen has a touch panel, and
the method further comprises determining whether indication information received from the touch panel indicates the specific object that exists in the second display region and is hidden on the second display screen.

7. A non-transitory computer-readable information recording medium stored with a game program for a game apparatus comprising an inputter that inputs operation information on a game, a first display screen and a second display screen that display different display regions of a game space, and a computer, the program causing the computer to execute:
moving a viewpoint in the game space based on the operation information input by the inputter;
generating images of the display regions displayed on the first display screen and the second display screen based on movement information on movement of the viewpoint, the first display screen displaying a first display region of the display regions and the second display screen displaying a second display region of the display regions, the first display region and the second display region being different regions of the game space and not overlapping;
determining whether a specific object that exists in the game space exists in the first display region of the first display screen and determining whether the specific object exists in the second display region of the second display screen; and displaying the specific object on the first display screen when the specific object is determined to exist in the first display region of the first display screen and hiding the specific object on the second display screen when the specific object is determined to exist in the second display region of the second display screen.

8. The game apparatus as claimed in claim 2, wherein the specific object contact determiner determines that the player character has contacted with the specific object displayed on the first display screen when the player character is within a predefined range of the specific object displayed on the first display screen and has contacted with the specific object hidden on the second display screen when the player character is within a predefined range of the specific object hidden on the second display screen.

9. The game apparatus as claimed in claim 2, wherein the predefined range corresponds to the specific object.

10. The game apparatus as claimed in claim 2, wherein the specific object contact determiner determines whether the player character has contacted with the specific object existing across both the first display region of the first display screen and the second display region of the second display screen.

11. The game apparatus as claimed in claim 1, wherein the specific object display controller outputs polygon information of the specific object when hiding the specific object on the second display screen.

12. The method as claimed in claim 5, wherein it is determined that the player character has contacted with the specific object displayed on the first display screen when the player character is within a predefined range of the specific object displayed on the first display screen and has contacted with the specific object hidden on the second display screen when the player character is within a predefined range of the specific object hidden on the second display screen.

13. The method as claimed in claim 12, wherein the predefined range corresponds to the specific object.

14. The method as claimed in claim 5, further comprising:
determining whether the player character has contacted with the specific object existing across both the first display region of the first display screen and the second display region of the second display screen.

15. The method as claimed in claim 4, further comprising:
outputting polygon information of the specific object when hiding the specific object on the second display screen.

16. The non-transitory computer-readable information recording medium as claimed in claim 7, the program causing the computer to further execute:
determining whether a player character, which is a subject of the viewpoint, has contacted with the specific object existing in the first display region and displayed on the first display screen and has contacted with the specific object existing in the second display region and hidden on the second display screen.

17. The non-transitory computer-readable information recording medium as claimed in claim 16, wherein it is determined that the player character has contacted with the specific object displayed on the first display screen when the player character is within a predefined range of the specific object displayed on the first display screen and has contacted with the specific object hidden on the second display screen when the player character is within a predefined range of the specific object hidden on the second display screen.

18. The non-transitory computer-readable information recording medium as claimed in claim 17, wherein the predefined range corresponds to the specific object.

19. The non-transitory computer-readable information recording medium as claimed in claim 16, the program causing the computer to further execute:
determining whether the player character has contacted with the specific object existing across both the first display region of the first display screen and the second display region of the second display screen.

20. The non-transitory computer-readable information recording medium as claimed in claim 7,
wherein the second display screen has a touch panel, and
the program causes the computer to further execute determining whether indication information received from the touch panel indicates the specific object that exists in the second display region and is hidden on the second display screen.

* * * * *